United States Patent [19]

Suzuki

[11] 4,340,580
[45] Jul. 20, 1982

[54] METHOD OF PRODUCING HYDROGEN

[76] Inventor: Masahiro Suzuki, 423, Yasaka, Kakegawa-shi, Shizuoka, Japan

[21] Appl. No.: 254,580

[22] Filed: Apr. 16, 1981

Related U.S. Application Data

[63] Continuation-in-part of Ser. No. 93,660, Nov. 13, 1979, Pat. No. 4,269,818.

[30] Foreign Application Priority Data

Nov. 13, 1978 [JP] Japan ................................. 53-139632

[51] Int. Cl.$^3$ ............................................... C01B 1/07
[52] U.S. Cl. .................................... 423/657; 423/636
[58] Field of Search ....................... 423/657, 658, 636; 204/45 R, 47, 48, 49, 52 R, 56 N

[56] References Cited

U.S. PATENT DOCUMENTS 2,389,181 11/1945 Brown .................................. 204/48
2,728,720 12/1955 Delong ............................. 204/32 R
3,030,282 4/1962 Passal ................................. 204/52 R
3,347,757 10/1967 Lacroix et al. ........................ 204/47
4,072,514 2/1978 Suzuki ............................ 423/657 X
4,264,362 4/1981 Sergev et al. ................... 423/657 X

FOREIGN PATENT DOCUMENTS 2508450 9/1975 Fed. Rep. of Germany ...... 423/657

*Primary Examiner*—Edward J. Meros
*Attorney, Agent, or Firm*—Blanchard, Flynn, Thiel, Boutell & Tanis

[57] ABSTRACT

Hydrogen is produced by placing a magnesium electrode and another electrode in an electrolyte solution, applying a direct or an alternating current voltage between said electrodes for activating said magnesium electrode until the surface of the magnesium electrode turns blackish in color; then discontinuing said voltage and then generating hydrogen by placing the activated magnesium electrode in sea water or an aqueous solution of a neutral salt.

5 Claims, No Drawings

METHOD OF PRODUCING HYDROGEN

CROSS-REFERENCE TO RELATED APPLICATION

This application is a continuation-in-part of Ser. No. 93 660, filed Nov. 13, 1979, now U.S. Pat. No. 4,269,818, the entire contents of which is incorporated herein by reference.

BACKGROUND OF THE INVENTION

The present invention relates to a method of producing hydrogen and more particularly to a method of producing hydrogen of extremely high purity, in a high yield, by a simple process that can be readily employed for practical use, without causing any pollution of the atmosphere.

More particularly, this invention relates to a method of producing hydrogen, using a magnesium object having a highly activated surface. In this method, the magnesium object is chemically or electrolytically treated in an electrolytic solution to form an activated surface on the object by applying a direct current or an alternating current voltage. The thus-activated magnesium object is immersed in sea water or an aqueous solution of neutral salt to produce hydrogen.

In recent years, hydrogen has attracted attention as a potential fuel. On combustion, hydrogen does not produce substances which are apt to pollute the atmosphere such as, for example, sulfur oxides and nitrogen oxides. It is safe, unless it is handled carelessly, and it possesses outstanding properties as a fuel.

For the production of hydrogen, there have heretofore been developed methods involving operations on a large commercial scale such as, for example, the method of effecting electrolysis of water, the method of treating petroleum gas and coal gas, and the method utilizing the secondary production of hydrogen attendant upon the electrolysis of alkalis.

All these operations inevitably require the use of facilities of large dimensions and they are apt to produce air pollution substances.

As a further method of producing hydrogen, the reaction between magnesium and water is known. This reaction is illustrated by the following chemical equation:

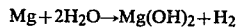

In this reaction, once magnesium hydroxide is formed on the surface of the magnesium, the formed magnesium hydroxide prevents further contact of the magnesium with water, so that the reaction is stopped and therefore the generation of hydrogen is also stopped.

With respect to this reaction, as disclosed in British Pat. No. 579 246, it is known that if the magnesium, for use in the reaction according to the foregoing chemical equation, is prepared in the form of a mixture or alloy with a metal, such as iron, nickel or copper, the reaction velocity in the rightward direction of the equation is accelerated and the quantity of hydrogen generated is proportionately increased.

However, it is not always easy to prepare magnesium for use in the reaction in the form of a mixture or alloy with, for example, iron, nickel or copper.

SUMMARY OF THE INVENTION

It is therefore a primary object of the present invention to provide a method of producing hydrogen by a simple process without causing any pollution of the atmosphere and in a high yield with a high purity.

Another object of the present invention is to produce hydrogen without requiring the use of facilities of large dimensions.

In the present invention, hydrogen is produced by immersing a magnesium electrode and another electrode in an electrolytic solution, applying a direct or an alternating current voltage across said electrodes until the surface of the magnesium electrode turns blackish in color in order to activate the magnesium and then immersing the magnesium electrode in a neutral salt solution or sea water.

DETAILED DESCRIPTION OF THE PREFERRED EMBODIMENTS

Generally, the present invention is based on the decomposition of water in accordance with the reaction scheme set forth below:

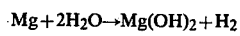

This reaction, however, stops once magnesium hydroxide is formed on the surface of the magnesium, so that in practice, the amount of hydrogen generated by this reaction is extremely small. In the present invention, a magnesium electrode in any arbitrary physical form, such as a ribbon, a plate or particles, is immersed in an electrolytic solution also containing another electrode containing, for example, nickel, copper, carbon, iron or platinum. By applying a direct current or an alternating current voltage between those electrodes in the electrolytic solution, the surface of the magnesium is highly activated electrochemically and quickly turns blackish in color. When the thus-treated magnesium is then immersed in a neutral salt aqueous solution, such as aqueous solutions of NaCl, KCl, $Na_2SO_4$, $K_2SO_4$, $NaNO_3$ or $KNO_3$ or sea water, hydrogen is generated vigorously and continuously. A significant feature of this activation is that, once magnesium is activated in the above-mentioned manner, the magnesium is no longer deactivated.

This activation can be achieved by connecting the magnesium electrode and the other electrode across a direct current source supplying a voltage, for example, in the range of 5 V to 500 V, for a short period of time.

When the thus-activated magnesium is then immersed in the neutral salt aqueous solution or sea water, hydrogen is generated vigorously.

The present invention will be described more specifically by referring to preferred embodiments and comparative examples. The following examples should be interpreted as illustrative and not in a limiting sense.

EXAMPLE 1

A magnesium piece 10 g in weight, connected as an anode, and a copper piece 20 g in weight, connected as a cathode, were placed in 1,000 ml of a 10 wt. % NaOH aqueous electrolyte solution and were connected to a direct current voltage supply of 500 V for 2 seconds which was effective to form a blackish and activated surface on the magnesium. When the activated magnesium was removed from the NaOH electrolyte solution and then was immersed in 1,000 ml of sea water, hydrogen was generated as follows:

| Immersion time (min.) | 10 | 20 | 30 | 40 | 50 | 60 | 70 | 80 |
|---|---|---|---|---|---|---|---|---|
| Cumulative volume of hydrogen (ml) | 1,105 | 4,317 | 7,450 | 9,826 | 10,563 | 11,028 | 11,241 | 11,321 |

EXAMPLE 2

A magnesium plate 5 g in weight and a copper piece 20 g in weight were placed in 1,000 ml of a 20 wt. % NaCl aqueous electrolyte solution and were connected to a direct current voltage supply of 100 V for 5 seconds, using the magnesium plate as an anode and the copper piece as a cathode. The surface of the magnesium plate was quickly changed to a blackish activated surface. When the activated magnesium plate was removed from the NaCl electrolyte solution and was immersed in 1,000 ml of another 20 wt. % NaCl aqueous electrolyte solution, hydrogen was generated as follows:

| Immersion time (min.) | 10 | 20 | 30 | 40 | 50 | 60 |
|---|---|---|---|---|---|---|
| Cumulative volume of hydrogen (ml) | 556 | 2,163 | 3,781 | 4,953 | 5,137 | 6,055 |

Similar result were obtained by applying an alternating current voltage in place of the direct current voltage.

EXAMPLE 3

(comparison)

For comparison with the above-mentioned Examples, a magnesium plate of 1.1 g in weight was immersed in 1,000 ml of water. However, hydrogen was scarcely generated.

Similar results were obtained when the procedure was repeated by using a magnesium plate 1.0 g in weight in place of the magnesium plate 1.1 g in weight and using sea water in place of water.

Further, when 1,000 ml of a 20 wt. % KCl or $Na_2SO_4$ aqueous solution was used instead of water, similar results were obtained.

From the foregoing results, it is manifest that the activated magnesium pieces obtained according to the present invention were quite effective, while comparative magnesium pieces which were not subjected to the activating treatment did not have an effect on the hydrogen-producing reaction.

EXAMPLE 4

In a 1.5 l container containing 1,000 ml of sea water were placed a ribbon of magnesium measuring 1.2 g in weight, as an anode, and an iron piece measuring 10 g in weight, as a cathode. The magnesium plate and the iron piece were connected to a direct current supply voltage of 12 V for 120 seconds. The surface of the magnesium plate was rapidly turned blackish and an activated surface was readily formed thereon. When the magnesium plate was taken from the sea water and was immersed in 1,000 ml of KCl aqueous solution containing about 60 g of KCl, hydrogen was generated as follows:

| Immersion time (min.) | 10 | 20 | 30 | 40 | 50 | 60 | 70 | 80 |
|---|---|---|---|---|---|---|---|---|
| Cumulative volume (ml) of hydrogen | 128 | 440 | 786 | 1,006 | 1,086 | 1,104 | 1,126 | 1,136 |

In Example 4, sea water, NaCl, $Na_2SO_4$, $K_2SO_4$, $NaNO_3$ and $KNO_3$ were employed instead of KCl, respectively. The results showed that almost the same amount of hydrogen as in Example 4 was respectively produced.

The embodiments of the invention in which an exclusive property or privilege is claimed are defined as follows:

1. A method for producing hydrogen by the reaction between magnesium and water, which comprises the steps of:

immersing a magnesium electrode and a second electrode in an aqueous electrolyte solution, and applying a direct or an alternating current voltage between said electrodes for activating the magnesium electrode until the surface of the magnesium electrode turns blackish in color and is thereby activated so that the magnesium electrode will rapidly react with water over an extended period of time to generate a large volume of hydrogen; and then immersing the activated magnesium electrode in sea water or an aqueous neutral salt solution, without applying a voltage thereto, and thereby generating hydrogen.

2. A method as claimed in claim 1 in which said neutral salt is selected from the group consisting of NaCl, KCl, $Na_2SO_4$, $K_2SO_4$, $NaNO_3$ and $KNO_3$.

3. A method as claimed in claim 1 or claim 2 in which said second electrode comprises nickel, platinum or iron.

4. A method as claimed in claim 1 or claim 2 in which said second electrode comprises copper or carbon.

5. A method as claimed in claim 1 or claim 2 in which said voltage is direct current voltage, said magnesium electrode is connected as the anode and said second electrode is connected as the cathode.

* * * * *